340-870.14 SR
XR 2,816,169

CROSS REFERENCE

Dec. 10, 1957 M. G. PAWLEY 2,816,169

MULTIPLEX COMMUNICATION SYSTEM

Filed Oct. 25, 1954 2 Sheets-Sheet 1

INVENTOR
MYRON G. PAWLEY

BY G. D. O'Brien
Q. Baxter Warner
ATTORNEYS

2816169
OR IN 179/15AM

MULTIPLEX COMMUNICATION SYSTEM

Filed Oct. 25, 1954

2 Sheets-Sheet 2

INVENTOR
MYRON G. PAWLEY

BY [signatures]
ATTORNEYS

United States Patent Office 2,816,169

Patented Dec. 10, 1957

2,816,169

MULTIPLEX COMMUNICATION SYSTEM

Myron G. Pawley, Riverside, Calif., assignor to the United States of America as represented by the Secretary of the Navy Application October 25, 1954, Serial No. 464,662

10 Claims. (Cl. 179—15)

(Granted under Title 35, U. S. Code (1952), sec. 266)

The invention described herein may be manufactured and used by or for the Government of the United States of America for governmental purposes without the payment of any royalties thereon or therefor.

This invention relates generally to multiplex communication systems and more specifically to a magnetic sequencing means for such systems.

In any communication device where it is desired to transmit a plurality of information channels over a single communication channel by time sharing, some means are required for sequentially switching the information channels to the transmitter. In addition, a synchronous sequencing operation must be produced at the receiver. Mechanically operated rotary switches have been used for sequencing. Also phase shifters designed to produce a different phase delay for each channel have also been used, but vacuum tube counter chains have been preferable to either because they permit more reliable synchronization between transmitter and receiver. Unfortunately, binary vacuum tube counter chains do not produce useable sequencing pulses directly. Because they count pulses in binary fashion and produce binary pulse groups representative of the number of pulses counted, their output must be applied through a crystal or resistor matrix to produce sequential triggering of the communication channels. Vacuum tube ring counter chains suffer from the disadvantage of providing relatively high impedance at terminals along the ring. Further disadvantages accompany any electronic form of sequencing device due to the large number of vacuum tubes associated therewith. These disadvantages are embodied largely in the excessive filament power and the inherent fragility of the vacuum tube elements. Although the mechanical structure of the tubes is improved in the expensive ruggedized versions, the cathode life remains a questionable element which is a constant source of breakdown and poses a complex trouble shooting problem in any multitube circuit.

While the saving of weight, space and power requirements, and the number of fragile components is sought in any system, it becomes particularly advantageous in airborne equipment. Since it is to these ends that this invention is directed, it is particularly applicable to telemetering systems and especially to airborne telemetering transmitters.

It is an object of this invention to provide a simplified multiplex communication system.

It is another object of this invention to provide a multiplex communication system having reduced weight, space and power requirements and fewer fragile components with no reduction in reliability.

It is another object of this invention to provide a sequencing means for a multichannel communication system requiring a minimum of vacuum tube components.

It is another object of this invention to provide a sequencing means having a low impedance output.

It is another object of this invention to provide a magnetic ring sequencing means.

It is still another object of this invention to provide an automatic reset means for a magnetic ring counter chain.

Other objects and many of the attendant advantages of this invention will be readily appreciated as the same becomes better understood by reference to the following detailed description when considered in connection with the accompanying drawings wherein.

Briefly, this invention sequentially produces pulses at a plurality of terminals by alternately pulsing alternate rings of a magnetic ring counter chain to sequentially produce a different magnetic state in one ring at a time and thereby provides the channel sequencing for a telemetering or other system without requiring a plurality of vacuum tubes or a matrix. An automatic reset circuit is provided to insure that only one ring has a different magnetic state from the others. The coupling of the rings into a chain is effected through crystal diodes to prevent a changed magnetic state induced in one ring from spreading further than to the next successive ring.

Figure 1:
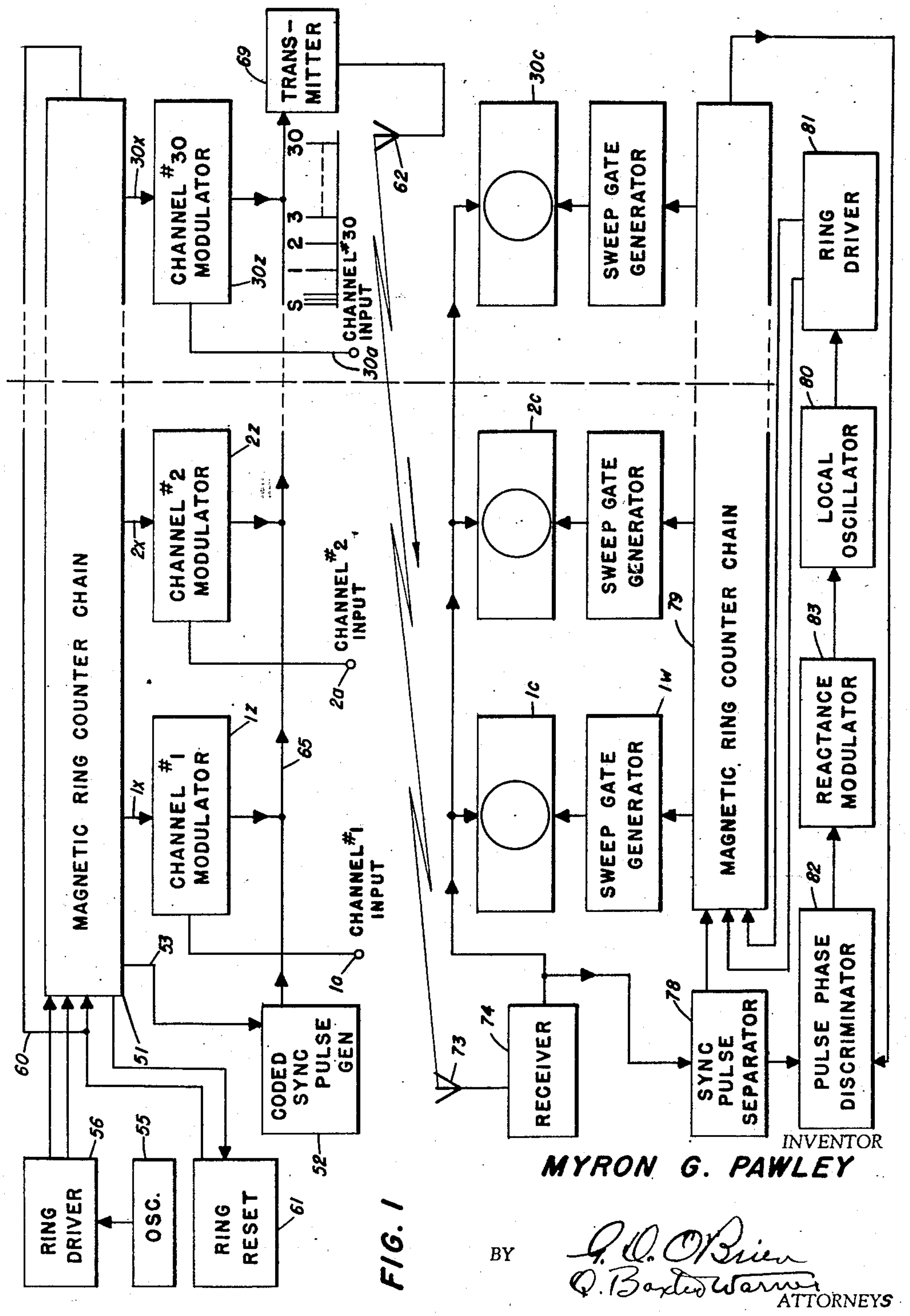
Fig. 1 is a block diagram of a telemetering system according to this invention.

Referring now to Fig. 1 in detail, a thirty channel telemetering system is shown in which the thirty channels are sequentially applied to the transmitter by means of a magnetic ring counter chain. In the receiver, indicators are sequentially gated through the action of another and synchronously operated magnetic ring counter chain.

Considering first the transmitter portion, the sequencing rate is determined by a master oscillator 55 which keys a ring driver 56. A magnetic ring counter chain 51 is driven synchronously with oscillator 55 by driver 56 to sequentially produce the channel timing pulses at thirty-one output terminals, only four (numbered 53, 1*x*, 2*x*, and 30*x*) of which are shown in Fig. 1. In a particular pulse train produced by the counter chain 51, the first pulse appears at output terminal 53 and is applied to a coded sync pulse generator 52. Synchronously therewith the sync pulse generator produces a characteristic or identifiable pulse such as the triple pulse group shown at S in the oscillogram in Fig. 1. The second pulse produced by the counter chain is applied from terminal 1*x* to the channel 1 modulator 1*z*. Here the pulse is delayed in time in accordance with the voltage appearing at the channel 1 input terminal 1*a*. This time modulation may be accomplished in any established manner, for example, the intelligence information may consist of a D. C. voltage applied to terminal 1*a* having a range between 0 and 5 volts D. C., the modulator may consist of a thyratron tube arranged to delay its response to a pulse at terminal 1*x* in accordance with the magnitude of the voltage at terminal 1*a*. Thus an output pulse is delivered to line 65 which will vary in time with respect to the arrival of the pulse at terminal 1*x* in accordance with the signal at terminal 1*a*. The third pulse in the counter chain is supplied from terminal 2*x* to the channel 2 modulator 2*z*, where it will be delayed in time in accordance with the intelligence information applied at channel 2 input terminal 2*a*. In a similar manner the other channels are sequentially sampled and time modulated. The outputs of the sync pulse generator 52 and the thirty channel modulators are shown combined in line 65 and applied to the telemetering transmitter 69. It will be understood that where necessary the line 65 may include suitable mixing circuits to provide isolation between the various channel modulators. In this manner a pulse train as shown in the oscillogram in Fig. 1 is produced consisting of a triple pulse synchronizing pulse S and a single time position modulator pulse 1 through 30 for each channel. At the conclusion of each pulse train, the counter chain recycles itself through the line 60 connecting the remote end of the chain back to the initial end thereof. A ring reset circuit 61 is provided to insure the proper initial condition of the counter chain for the production of the first pulse train in any communication operation. Reset 61 also operates automatically to insure proper resetting of the counter chain between all subsequent pulse trains.

The telemetering receiver may be linked to the transmitter through an antenna and a radio link, or in other communication applications could be linked by wire lines. As shown, the signal from transmitting antenna 62 is picked up in receiving antenna 73 and fed to the receiver unit 74. After the necessary amplification and detection, the pulse train is fed in parallel to a number of indicating or recording cathode ray indicators represented at 1*c* through 30*c*. Camera means, not shown in Fig. 1, may be utilized to record deflecting cathode ray traces on moving photographic film or paper. To obtain a separate film record for each channel, a separate indicating tube may be used for each. However, it is considered more practical to use less tubes and obtain the information from a composite film record. Therefore, the usual practice is to divide the receiver channel information among five indicator tubes or recorders and if desired all receiver channels may be fed to one recording means. The pulse train from receiver 74 is also applied to a sync pulse separator 78 which removes the triple sync pulse and uses it to reset a receiving ring counter chain 79 which is also keyed to a receiver local oscillator 80 and a ring driver 81. To insure synchronous operation of the transmitter and receiver driver oscillators 55 and 80, the sync pulse from separator 78 is combined in a pulse phase discriminator 82 with the channel 30 sequencing pulse from the magnetic ring counter chain 79. If the predetermined phase separation is found not to exist, a control signal is fed from the discriminator 82 to a reactance modulator 83 which is a part of and controls the frequency of the local oscillator 80. The frequency of local oscillator 80 will then be changed in such a direction as to restore the predetermined phase difference in discriminator 82 and establish exact synchronization between the receiver and transmitter portions of the telemetering system.

Figures 2, 3:
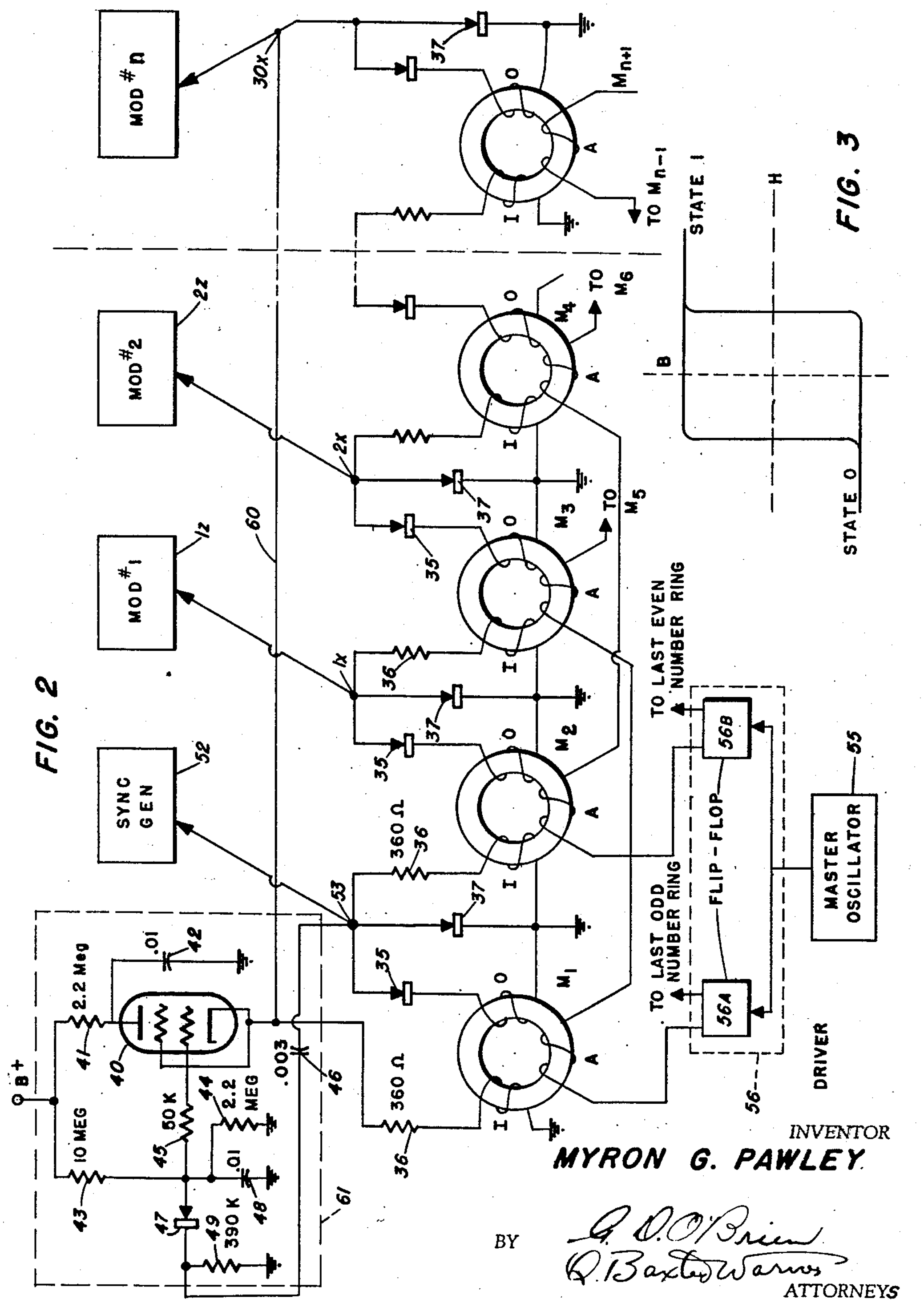
Fig. 2 is a schematic diagram partly in block of the sequencing means of Fig. 1.
Fig. 3 shows the hysteresis loop of the magnetic material used in this invention.

Referring now to Fig. 2 the schematic diagram of a preferred ring counter circuit according to this invention is shown. As shown, the magnetic ring counter chain is made up of a series of small toroidal saturable reactors, one for each channel and one for the synchronizing pulse stage. Each reactor is approximately three quarters of an inch in outside diameter and has a core made up of several turns of thin magnetic ribbon. Each magnetic ring reactor has three windings which are known as the input winding, the output winding and the advancing winding, these windings are respectively labeled I, O, and A.

The magnetic material used for these rings has a hysteresis loop as shown in Fig. 3. The upper portion of the loop is known as state 1 and the lower portion is known as state 0. Therefore, a large positive magnetizing pulse will leave the magnetic core with a positive residual magnetism as represented by state 1 of Fig. 3. A large negative magnetizing pulse leaves the core in state 0. In the practice of this invention the cores of the magnetic rings are always operated so as to be in either state 1 or state 0. It will be readily understood that a magnetic ring which is already in state 1, if further energized by a large positive magnetizing pulse, will merely remain in state 1. Conversely, if a magnetic ring in state 1 is energized by a large negative magnetizing pulse, that ring will not only be changed to state 0 but will also remain in state 0 thereafter. Further, it will be seen that if a ring is changed from state 1 to state 0, and the ring has an auxiliary winding thereon, that a large pulse of current will be induced in that auxiliary winding when the ring changes its state. With these characteristics of the magnetic ring in mind, the operation of the Fig. 2 embodiment may be readily understood.

Returning now to Fig. 2, the master oscillator 55 is shown connected to the driver 56 consisting of a scale of two flip-flop circuit represented by blocks 56A and 56B. Thus, one pulse from oscillator 55 will produce an output pulse from driver element 56A and the next consecutive pulse from oscillator 55 will produce an output only from the driver element 56B. Driver element 56A may be considered the odd ring driver, since it is connected to the advancing winding of each of the odd numbered magnetic rings. Since this is a current pulse the odd ring advancing windings are connected in series. In a similar fashion the even driver element 56B is connected to the advancing windings of all the even numbered magnetic rings, which latter windings are also serially connected. Means are provided for coupling the output winding of each ring to the input winding of the next consecutive ring. The input winding of ring M1 is connected to the reset circuit which is here shown in detail, and will be discussed below.

Suppose that through the action of the reset circuit connected to the input winding of ring M1, this ring has been driven to state 1 and all the other rings have been driven to state 0. Now it is wished to start the sequencing operation and through triggering from oscillator 55, odd driver element 56A is caused to deliver a large negative magnetizing pulse to all the odd advancing windings. With the exception of M1, all the rings are already in state 0 and will not produce any response to this pulse from 56A. However, ring M1 will be driven to state 0 by this large negative magnetizing current and will induce a large current in its output winding O. The windings are arranged so that the induced current in winding O will constitute a positive magnetizing current and will be fed through a crystal diode of proper polarization and a load resistor 36 to the input winding of ring M2. Since this is a positive magnetizing pulse, it will change the state of ring M2 to state 1. At this point ring M1 will have been changed to state 0 and ring M2 changed to state 1, thus ring M2 is now the only ring in state 1. The change occasioned in ring M2 will also induce a pulse in its output winding, however, the input winding I and the output winding O of each of said rings are so arranged in polarity that when a ring is changed to state 1 by a positive magnetizing pulse applied to its input winding, a negative magnetizing pulse will be induced in its output winding. Thus the crystal diode 35, which is poled to carry only positive magnetizing pulses, will prevent this negative pulse from reaching the input winding of the next consecutive ring M3, and no further changes of state will occur in the counter chain due to the negative magnetizing pulse from driver element 56A. When ring M1 changed its state, due to the pulse applied to its advancing winding, a pulse is also induced in its input winding I which is coupled through a resistor 36 and line 60 to the output winding of the last ring $M_{N+1}$, however, line 60 is coupled to ground through a crystal diode 37 which is suitably poled to short circuit this induced pulse to ground and prevent its transfer back to the output winding of ring $M_{N+1}$.

In a similar manner, the next pulse from oscillator 55 produces a negative magnitizing current from driver element 56B to all the even numbered advancing windings. Since the only ring in the proper state to be effected by this negative magnetizing pulse is ring M2, ring M2 will be changed to state 0 and a positive magnetizing pulse induced in its output winding and coupled through diode 35 and resistor 36 to the input winding of ring M3 causing ring M3 to be changed to state 1. As in the case of rings M1 and M2, the change of states in rings M2 and M3 produced by a negative magnetizing pulse in the advancing winding of ring M2, will not be transferred beyond these two rings. The pulse induced in the input winding of ring M2 will be shorted to ground through diode 37 and thus isolated from ring M1. The pulse induced in the output winding of ring M3 will be blocked by diode 35 and prevented from reaching the input winding of ring M4. In a similar manner, state 1, which initially existed only in ring 1, will be transferred down the chain of rings such that state 1 always exists in one ring and only one ring. After state 1 has been initiated in ring $M_{n+1}$ and this ring is then changed back to state 0, a positive magnetizing pulse from the output winding of ring $M_{n+1}$ will be transferred through diode 35 in the output circuit of ring $M_{N+1}$, through line 60 and resistor 36 back to the input winding of ring M1. Thus, the operation of the counter chain is self-recycling and continuous during the operation of master operator 55.

Each time state 1 is transferred from one ring to its next consecutive ring, for example from ring M1 to ring M2, the positive magnetizing pulse flowing from the output winding of ring M1 through diode 35 and resistor 36 to the input winding of ring M2 develops an output pulse across the resistor 36. Thus an output pulse appears at the junction of diodes 35 and 37 and resistor 36 coupling ring M1 to M2. This junction is the output terminal 53 referred to in Fig. 1 and hence is the output pulse delivered to the sync generator 52.

To insure that ring M1 is in state 1 and is the only ring in state 1 when the system is initially placed in operation, or in the event of a power interruption or other spurious failure of the system, automatic ring reset circuit 61 is provided. This circuit is shown schematically in detail in Fig. 2 and will now be considered. In the preferred embodiment of the reset circuit shown, a pentode type tube 40 is connected as a relaxation oscillator with its plate connected to B+ through a large resistor 41 and to ground through a condenser 42 which provides the time constant controlling the relaxation period. In the absence of voltage from sources external to the reset circuit, a small positive bias is coupled to the grid of tube 40 to permit the tube to become conductive when plate condenser 42 has charged to a critical voltage. The bias is obtained by the voltage dividing actions of resistors 43 and 49 and diode 47 serially connected between B+ and ground. The grid of tube 40 is connected through a current limiting resistor 45 to the junction of resistor 43 and diode 47. The cathode of tube 40 is connected to ground through the load resistor 36 and the input winding of magnet M1. A reset pulse is supplied by tube 40 when its plate has charged to a sufficiently high value to place the tube in conduction. In order that the reset circuit can sense when a reset pulse is required by the counter chain means are provided to further influence the grid bias of tube 40 in response to the activity of the counter chain. This is accomplished by connecting the output pulse terminal 53 of the counter chain through a coupling condenser and a suitably poled diode 47 to the junction of resistors 43, 44 and 45. This junction is also connected to ground through a condenser 48. As a result, the output pulse produced at terminal 53 of the counter chain supplies a negative incremental charge to the condenser 48 of the reset circuit 61. The time constants are so selected that when the counter chain is recycling at its normal rate, the negative chares applied to condenser 48 will arrive sufficiently often to maintain a negative bias on tube 40 of such magnitude that full charging of plate condenser 42 will be insufficient to render tube 40 conductive. However, should the counter chain miss a few cycles, the negative voltage accumulated on condenser 48 will be discharged to ground through resistor 44, thus permitting tube 40 to become conductive and produce a reset pulse for ring M1. The resistor 49 is a much smaller value than resistor 44 as indicated in the drawing, but because of the presence of diode 47, the negative charge accumulated by condenser 48 can be discharged only through the larger value resistor 44. The time constant determined by resistor 41 and condenser 42 is selected to provide a period for the relaxation oscillator considerably longer than the interval required for a complete cycle of the counter chain to prevent the oscillator from interfering with the operation of the counter chain once the cycle has started. Thus, in initiating operation of the counter chain the advancing pulses first drive all the magnetic rings into the same state, and the chain remains inactive until the capacitor 42 has been sufficiently charged through resistor 40 to enable tube 40 to fire. The current in tube 40 passes through the input winding of ring M1 reversing the direction of flux and changing the magnetic state of ring M1, thereby permitting the desired pulse producing change in magnetic flux to be advanced along the counter chain. As the counter chain cycles, each pulse induced in the output coil of ring M1 provides a negative charge on the capacitor 48 associated with the grid control tube 40, building up a bias on this grid to prevent firing thereof. As a result, recurrent firing of tube 40 is prevented so long as the counter chain is cycling as desired. Upon failure of the chain to cycle within the discharge time of condenser 48, condenser 42 having in the meanwhile charged, tube 40 fires again to initiate action of the counter chain as before. A further treatment of magnetic ring counters of the general type used herein may be found in an article by An Wang and Way Dong Woo in the January 1950 "Journal of Applied Physics" beginning at page 49.

Considering now the operation of the complete system shown in Fig. 1, the magnetic ring counter chain 51 in conjunction with its driver, provide a pulse for each of channels 1 through 30 successively plus one for the synchronizing channel, each substantially equally spaced in time from the preceding and succeeding channels. Each of the pulses 1 through 30 are then time modulated by the modulators 12 through 30z in response to a control voltage or the like derived by a suitable control instrument to indicate the component condition being analyzed. These modulated outputs are then mixed and successively transmitted by radio to the remote receiving station. In addition to the thirty modulating channels, a pulse is also applied in sequence to the transmitter from the coded synchronizing pulse generator 52, which is similarly transmitted to the ground receiving station. There is thus provided at the receiving station with each repetition cycle of the counter chain, a plurality of thirty pulses successively received and time modulated about a known time reference, plus a coded and identifiable synchronizing pulse for providing a definite starting time reference for each repetition cycle of the counter chain.

The transmitted pulses are received at the receiver and applied to the intensity grid or a deflection plate of a plurality of cathode ray tubes connected in parallel and indicated at 1*c* through 30*c*. At the same time, a second magnetic ring counter chain 79 is driven in exact synchronizm with that of the first counter 51 through the action of a synchronizing pulse and synchronizing pulse separator 78 in the receiver. One or more of the sequentially produced pulses from the receiver ring counter chain which correspond to those applied to channel modulators in the transmitter are applied to one or more sweep gate generators shown at 1*w*. Each sweep gate generator is connected to an appropriate cathode ray tube, and operates to initiate a sweep therein to reveal the traces of a number of information channels. With a sufficiently long sweep initiated by the frame synchronizing pulse separated by the sync pulse separator 78 a single cathode ray tube would reveal the traces of all thirty channels which could thus be recorded simultaneously on a single moving film. Ordinarily, however, a number of cathode ray tubes would be utilized by synchronizing their sweeps in suitable time sequence by pulses from appropriate terminals of the receiver magnetic ring counter chain 79. Separate cameras for each cathode ray tube would then record distinct groups of information traces on separate moving films. In all cases the cathode ray beam on a cathode ray tube assumes a position with respect to the initiation of the sweep which is representative of the information applied to the corresponding channel modulator in the transmitter. Alternate decoding means may be employed to convert the pulse time modulated channel signals to varying D.-C. for meter display or oscillographic recording.

It will be observed, that because a magnetic ring counter chain as herein disclosed has one element at a time in a state distinctive from all of the other elements, sequential pulses at separate output terminals are provided without the need for the usual crystal or resistor matrix circuits, while the crystal diodes used in the counter chain itself do not represent a circuit more complex but in fact simpler than that of the usual vacuum tube counter chain. In addition, it will be noted that the output terminals of the counter chain are taken across the magnetic winding and therefore are low impedance outputs. Thus, the output pulses from said magnetic counter chain may be applied to remotely located channel modulators or the like without the necessity of adding cathode follower elements.

Obviously many modifications and variations of the present invention are possible in the light of the above teachings. It is therefore to be understood that within the scope of the appended claims the invention may be practiced otherwise than as specifically described.

What is claimed is:

1. A multiplex communication system comprising a first magnetic counter chain driven to sequentially produce a plurality of output pulses each at a separate output terminal a synchronizing pulse generator connected to one output terminal, a plurality of information input terminals and a plurality of channel modulators each connected to one input terminal, each of the remaining counter output terminals being connected to one channel modulator, a transmitter connected to the output of said synchronizing pulse generator and each of said channel modulators, a remotely located receiver tuned to said transmitter and connected to a plurality of cathode ray tube indicating devices, a second magnetic counter chain driven by the received synchronizing pulses to sequentially produce a plurality of output pulses each at a separate output terminal, a plurality of sweep gate generators each connected to one of said indicating devices, each of the output terminals of said second counter chain being connected to one of said sweep gate generators.

2. In the communication system of claim 1, an automatic reset circuit for the first magnetic counter chain comprising a relaxation oscillator having a relaxation period equivalent to several complete cycles of said counter chain, and a disabling circuit for disabling said oscillator in response to the proper cycling of said counter chain.

3. A multiplex communication system for a plurality of information channels comprising, a plurality of information input channels, a single output channel, a channel sequencing means for sequentially introducing information from said input channels to said output channel, said sequencing means including a plurality of magnetic rings one greater than the number of channels, each of said rings being of readily saturable material, each of said rings having an input, an output and a pulse advancing winding wound thereon, a unilateral path connecting the output winding of each ring to the input winding of its adjacent ring, an oscillator having a pair of output terminals for alternately supplying pulses to its output terminals, one of said oscillator output terminals being serially connected to the advancing windings of all the odd numbered rings, the other oscillator output terminal being serially connected to the pulse advancing windings of all the even numbered rings, a sequencing pulse output terminal in the unilateral path of each adjacent pair of rings, a plurality of channel modulator means each having an output connected to the output channel and one input connected to a sequencing pulse output terminal and another input connected to an information channel for introducing information from its respective input channel to the output channel.

4. A multiplex communication system for a plurality of information channels comprising, a plurality of information input channels, a single output channel, a channel sequencing means for sequentially introducing information from said input channels to said output channel, said sequencing means including a plurality of magnetic storage devices one greater than the number of channels, a periodic pulse oscillator, each of said magnetic devices being inductively coupled to its adjacent device and to said oscillator to change the magnetic state of one device in response to each pulse of said oscillator, an output terminal at each device producing an output pulse each time that device changes to a predetermined magnetic state, a plurality of channel modulator means each having an output connected to said output channel and inputs connected to an output terminal of one magnetic device and to an information channel for introducing information from its respective input channel to the output channel in response to an output pulse from its respective magnetic device, a reset pulse generator connected to one of said magnetic device for delivering a state changing pulse thereto when all said devices are in the same magnetic state.

5. A multiplex communication system for a plurality of information channels comprising, a plurality of information input channels, a single output channel, a channel sequencing means for sequentially introducing information from said input channels to said output channel, said sequencing means including a plurality of magnetic storage devices one greater than the number of channels, a periodic pulse oscillator, each of said magnetic devices being inductively coupled to its adjacent device and to said oscillator to change the magnetic state of one device in response to each pulse of said oscillator, an output terminal at each device producing an output pulse each time that device changes to a predetermined magnetic state, a plurality of channel modulator means each having an output connected to said output channel and inputs connected to an output terminal of one magnetic device and to an information channel for introducing information from its respective input channel to the output channel in response to an output pulse from its respective magnetic device, a reset pulse generator including a relaxation oscillator having a natural period greater than the period of any of said magnetic devices, means connecting one of said devices to said relaxation oscillator to disable its oscillation in response to recurring pulses produced by said device, and means connecting said relaxation oscillator to one of said devices to change its magnetic state in response to an oscillation of said oscillator when all said devices are in the same magnetic state.

6. A multiplex communication system for a plurality of information channels comprising, a plurality of information input channels, a single output channel, a channel sequencing means for sequentially introducing information from said input channels to said output channel, said sequencing means including a plurality of magnetic rings one greater than the number of channels, each of said rings being of readily saturable material, each of said rings having an input, an output and a pulse advancing winding wound thereon, a unilateral path connecting the output winding of each ring to the input winding of its adjacent ring, oscillator means for supplying periodic pulses to the pulse advancing windings of said rings, a sequencing pulse output terminal in the unilateral path of each adjacent pair of rings, a plurality of channel modulator means each having an output connected to the output channel and one input connected to a sequencing pulse output terminal and another input connected to an information channel for introducing information from its respective input channel to the output channel, a reset pulse generator including a relaxation oscillator tube having a cathode serially connected with the input winding of one of said rings, a time constant circuit connecting a sequencing pulse output terminal of one of said rings to said tube to bias it nonconducting in response to recurring pulses at said output terminal, and a time constant circuit at the anode of said tube to establish its period as greater than that of any output pulse of said rings.

7. A multiplex communication system comprising, a time modulated multiplex pulse train receiver, a plurality of cathode ray tube indicators equal in number to the number of multiplex channels, said receiver output being connected in parallel to a deflection input of all of said cathode ray tube indicators, a magnetic counter chain connected to said receiver and driven by synchronizing pulses received thereby to sequentially produce a plurality of output pulses, each at a separate output terminal, a plurality of sweep generators each connected between a cathode ray tube indicator and a counter output terminal to generate sweeps in synchronism with its respective counter output pulse.

8. A multiplex communication system comprising a first magnetic counter chain driven to sequentially produce a plurality of output pulses each at a separate output terminal, a synchronizing pulse generator connected to one output terminal, a plurality of information input terminals and a plurality of channel modulators each connected to one input terminal, each of the remaining counter output terminals being connected to one channel modulator, a transmitter connected to the output of said synchronizing pulse generator and each of said channel modulators, a remotely located receiver tuned to said transmitter and connected to a plurality of cathode ray tube indicating devices, a second magnetic counter chain driven by the received synchronizing pulses to sequentially produce a plurality of output pulses each at a separate output terminal, a plurality of sweep gate generators each connected to one of said indicating devices, each of the output terminals of said second counter chain being connected to one of said sweep gate generators, and means for synchronizing the receiver to said transmitter.

9. A multiplex communication system for receiving signals from a transmitter comprising, a time modulated multiplex pulse train receiver, a plurality of cathode ray tube indicators equal in number to the number of multiplex channels, said receiver output being connected in parallel to a deflection input of all of said cathode ray tube indicators, a magnetic counter chain connected to said receiver and driven by synchronizing pulses received thereby to sequentially produce a plurality of output pulses, each at a separate output terminal, a plurality of sweep generators each connected between a cathode ray tube indicator and a counter output terminal to generate sweeps in synchronism with its respective counter output pulse, and means for synchronizing the receiver to the signals from a transmitter.

10. A multiplex communication system for receiving signals from a transmitter comprising, a time modulated multiplex pulse train receiver, a plurality of cathode ray tube indicators equal in number to the number of multiplex channels, said receiver output being connected in parallel to an input of all of said cathode ray tube indicators, a synchronizing pulse separator connected to said receiver, a pulse phase discriminator connected to said separator, a reactance modulator connected to said discriminator, a local oscillator connected to said modulator, a ring driver connected to said oscillator, a magnetic counter chain connected to said separator and said ring driver, said separator removing the synchronizing pulses received thereby to reset said magnetic counter chain to sequentially produce a plurality of output pulses, each at a separate output terminal, the last channel output terminal connected to said discriminator, said discriminator determining the phase separation between a synchronizing pulse and a sequencing pulse from said last channel output received thereby to feed a control signal to said modulator to change the frequency of said oscillator to restore the phase separation to a predetermined phase difference to establish synchronization between the receiver and the signals from a transmitter, a plurality of sweep generators each connected between a cathode ray tube indicator and a counter output terminal to generate sweeps in synchronism with its respective counter output pulse.

References Cited in the file of this patent

UNITED STATES PATENTS

| | | |
|---|---|---|
| 2,485,591 | Grieg | Oct. 25, 1949 |
| 2,534,844 | Wallace | Dec. 19, 1950 |
| 2,543,736 | Trevor | Feb. 27, 1951 |
| 2,652,501 | Wilson | Sept. 15, 1953 |